April 20, 1926.

A. M. HARRELSON

MOTOR DYNAMO ELECTRICAL MACHINERY

Filed April 1, 1921  4 Sheets-Sheet 1

1,582,019

Inventor:
ALLEN M. HARRELSON,
His Attorney

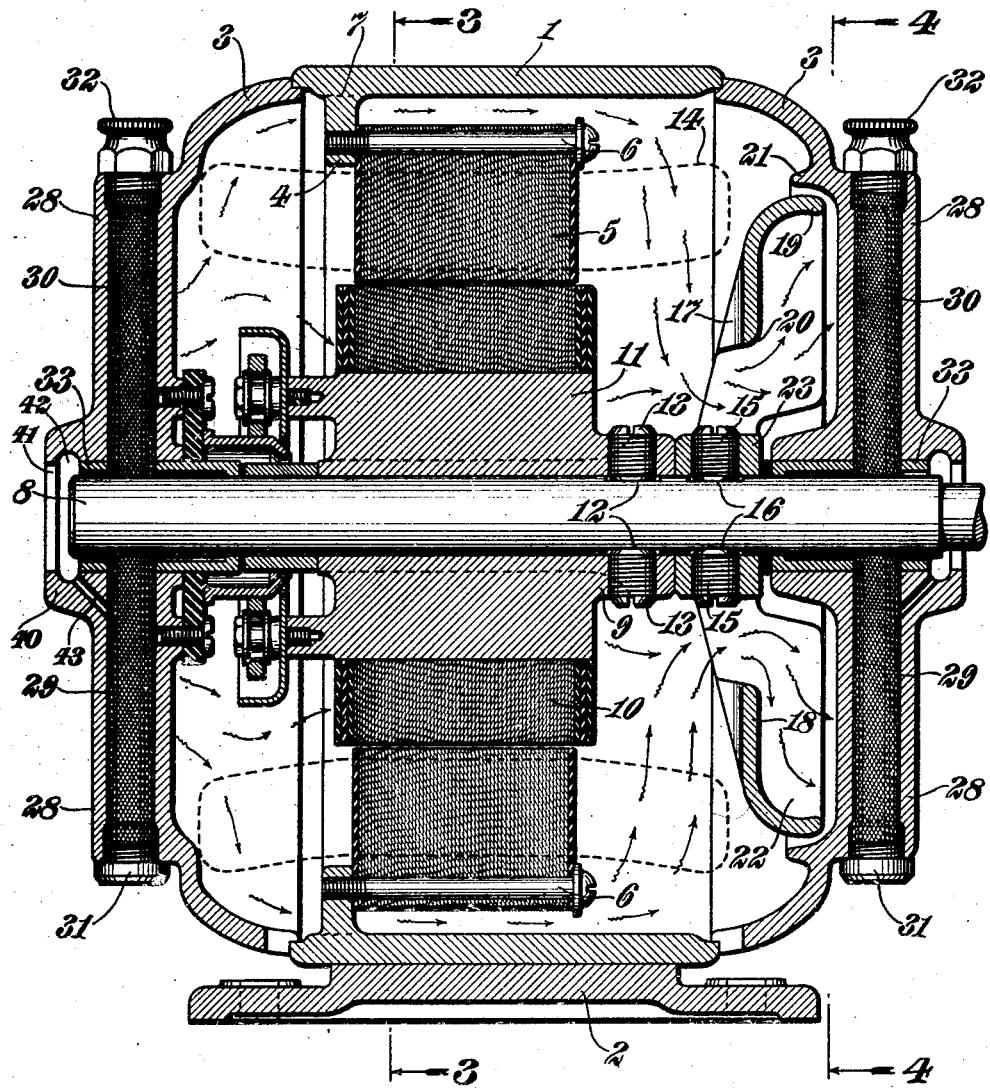

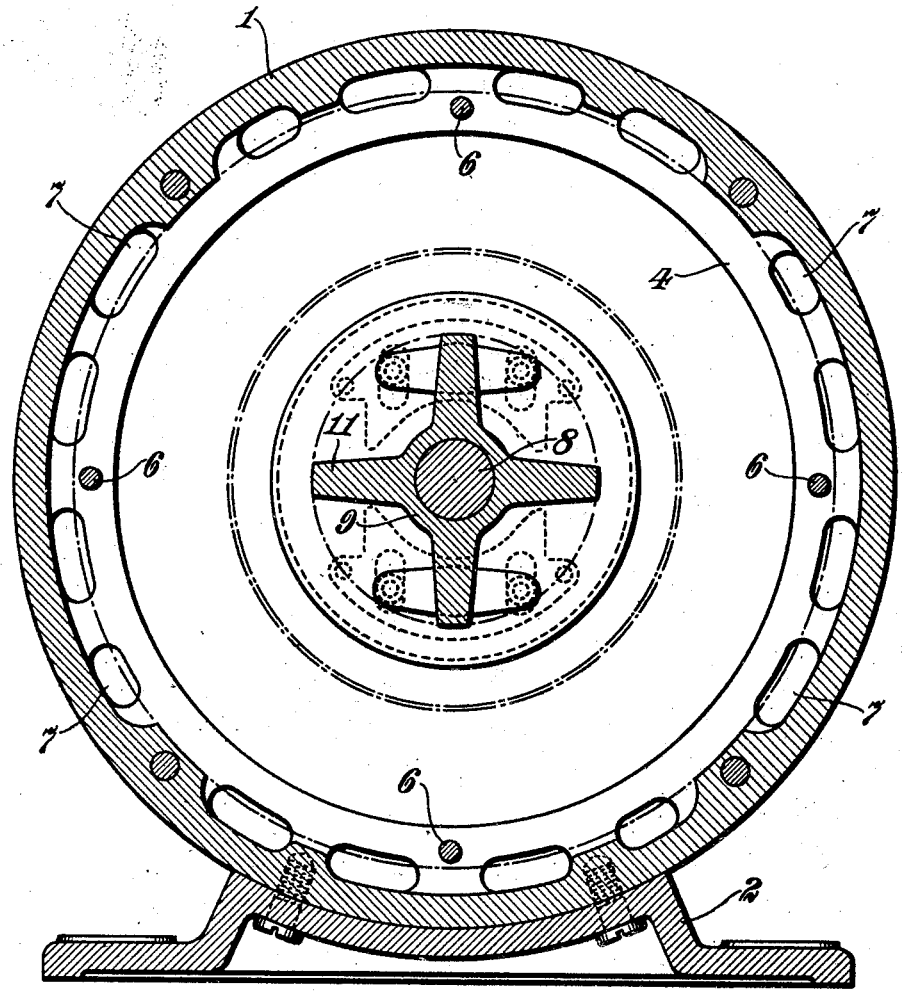

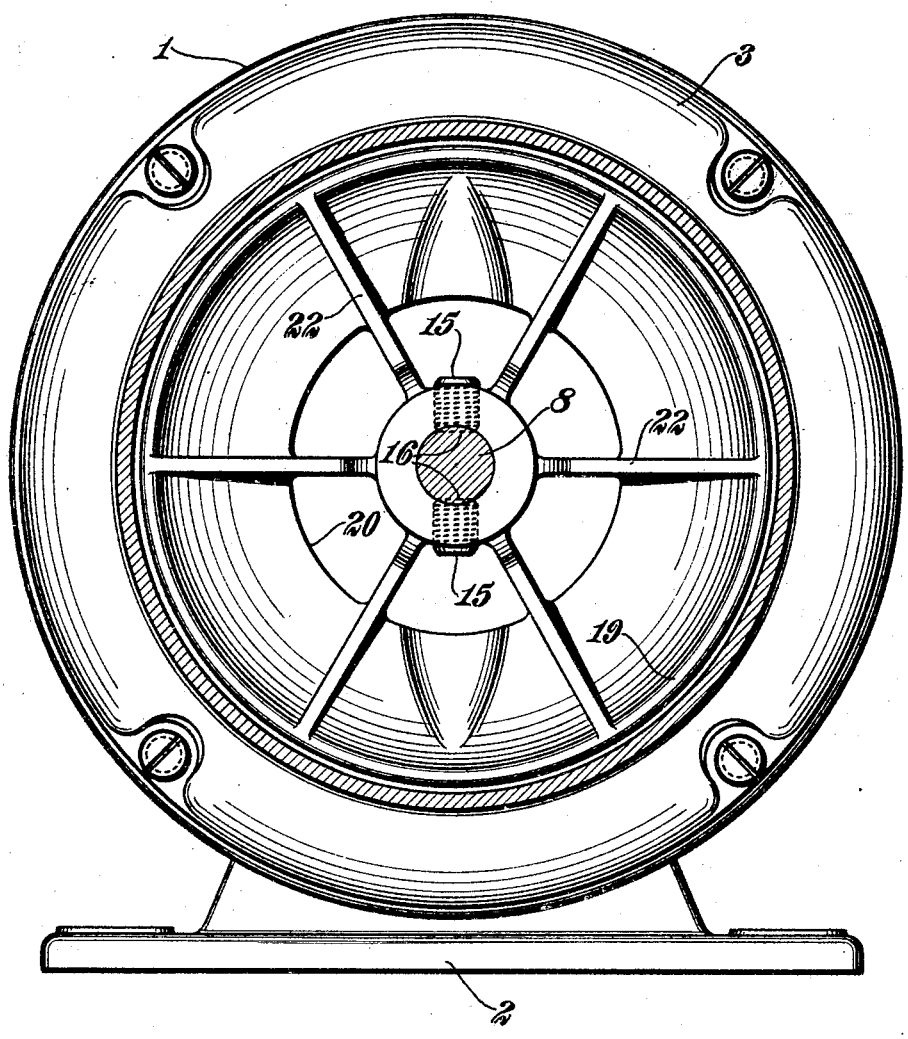

Patented Apr. 20, 1926.

1,582,019

UNITED STATES PATENT OFFICE.

ALLEN M. HARRELSON, OF ST. LOUIS, MISSOURI.

MOTOR-DYNAMO ELECTRICAL MACHINERY.

Application filed April 1, 1921. Serial No. 457,643.

*To all whom it may concern:*

Be it known that I, ALLEN M. HARRELSON, a citizen of the United States, residing at St. Louis, Missouri, have invented new and useful Motor-Dynamo Electrical Machinery, of which the following is a specification.

This invention relates to electrical machinery and more particularly to motors and generators, and consists in the novel construction hereinafter disclosed and claimed.

The primary object of the invention is to produce a machine of the character mentioned with means for cooling it to maintain the temperature thereof, under operative conditions, sufficiently low to prevent damage to parts of the machine.

Another object of the invention is to produce a machine of the class mentioned, so designed and arranged that its efficiency in operation will be maintained by reducing the increase in electrical resistance resulting from the overheating of the circuits.

Another object of the invention is to provide a machine of the class described, with equipment operating as an incident to the operation of the motor to cause a circulation of cooling air currents throughout the machine to preserve the thermal condition of the machine at a temperature required to maintain the motor in a condition for highest efficiency when in operation, and to prevent damage to the machine.

With the foregoing, as well as additional objects and structural advantages in view, I have designed a machine as hereinafter described, reference being made to the accompanying drawings in which—

Fig. 2 is a vertical sectional view taken approximately on the line 2—2 of Fig. 1.

Fig. 3 is a vertical sectional view taken approximately on the line 3—3 of Fig. 2, certain of the parts being indicated in outline.

Fig. 4 is a cross sectional view taken approximately on the line 4—4 of Fig. 2.

Figure 1:
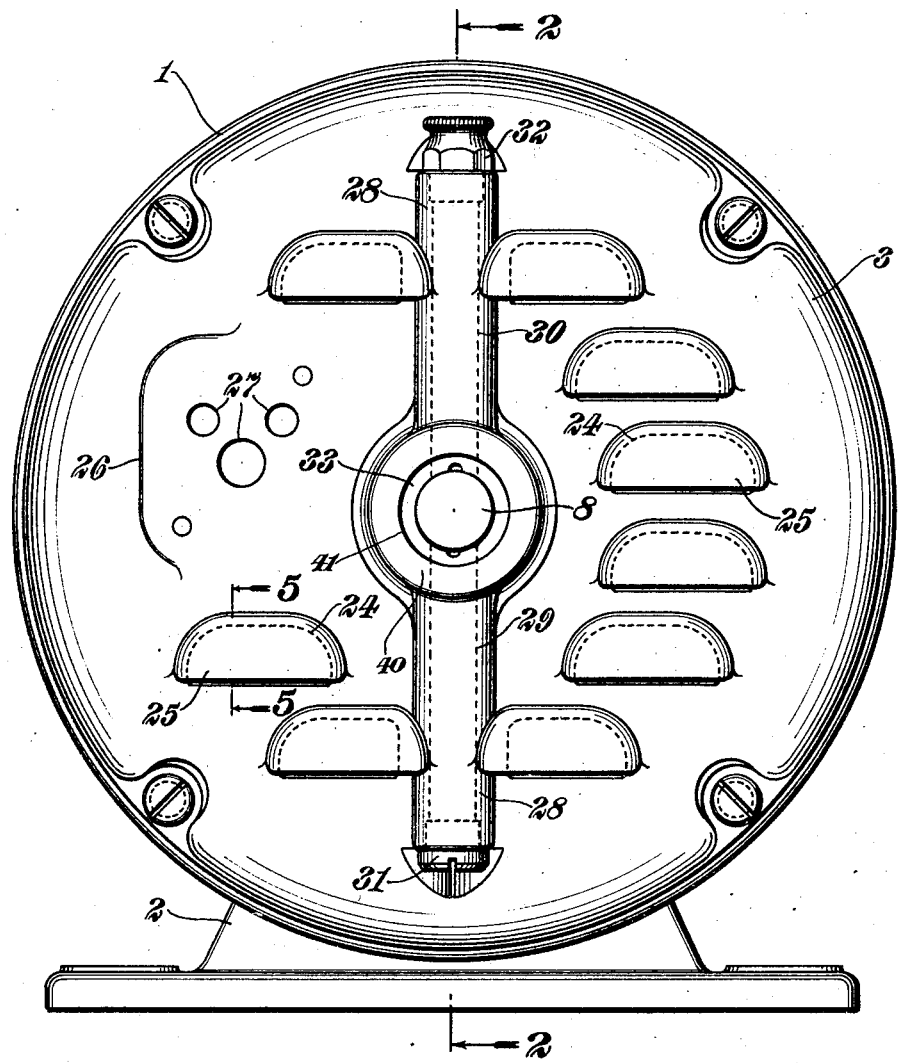
Fig. 1 is an end elevation of the machine.
Figure 5:
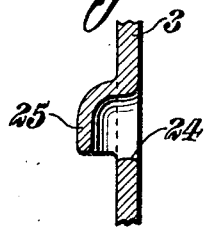
Fig. 5 is a fragmentary vertical sectional view taken on the line 5—5 of Fig. 1.

In the embodiment of the invention, illustrated in the drawings, the outer structure of the machine consists of a substantially cylindrical frame 1 supported by a base 2; and end plates 3 secured to the frame and, together therewith forming a housing for the operative parts of the machine. An internal flange 4, preferably cast integrally with the frame adjacent to the air influent end thereof, is provided to support the field magnet elements 5. A series of supporting screws 6, threading into said ring, are provided for attaching said elements to the frame.

The field magnet elements are spaced a slight distance from the interior surface of the frame, and a plurality of openings 7 are formed in the flange 4, adjacent to the point of juncture of the ring with the interior surface of the frame, so that there may be a passage of air through said openings, and between the field magnet elements and the frame. Thus, the currents of air will traverse the outer surface of the field magnet elements, as well as the inner surface of the frame.

The armature shaft 8 extends longitudinaly of the housing and is supported in the bearings in the end plates 3. The armature shaft 8 supports a spider 9, which carries the armature magnet elements 10. The elements 10 are supported by the radial arms 11 of the spider, leaving longitudinal passages between the armature and the body of the spider 9. A convenient means for attaching the armature support to the shaft 8 is shown, the same comprising flattened recesses 12 in the shaft 8 receiving the ends of the screws 13, which are threaded through the sleeve of the spider and engaged in said recesses.

It will be understood that the field windings are supported within the housing, their position or arrangement in the housing being indicated in outline by the dotted line 14.

The device for causing circulation of air comprises a fan 17, which is connected with the shaft 8 in any suitable manner, the means indicated being flattened recesses 16 in the shaft 8 and screws 15, threaded through the hub of the fan element, and engaging in the recesses.

The fan includes a hub 23 and a plurality of radial vanes or blades 22, and a convex wall, joining with the inner edges of the blades. The convex wall comprises a web 18 that is turned outwardly at its extremity, forming a rim 19.

The central portion of the web 18 between the blades or vanes 22 is cut out to form an opening or passage-way 20.

In order to obtain the best results, the outer edge of the fan is arranged in close proximity to the inner surface of the adjacent end plate 3, said end plate having an inwardly extending bead 21, that surrounds the outer rim 19 of the fan. The adjacent end plate 3 is provided with a plurality of discharge openings 24, so positioned that the currents of air from within the machine housing are discharged therethrough by the fan.

It will be observed that the openings 24 are arranged in an arcuate series approximately concentric with the axis of the fan and registering with the discharge area of the fan.

In order to prevent, as far as possible, the ingress of foreign matter and moisture through the opening 24, each opening may be provided with a hood or shield 25, extending over the top of the opening.

It will be understood that both of the end plates, that is to say, the one at the inlet end of the housing and the one at the discharge end of the housing, are substantially duplicate in construction, and that both include the openings 24 preferably with the shields or hoods 25, similarly arranged. At one end of the housing, in order to provide a mounting for the terminals or leads of the machine, one or more of the openings may be omitted and a boss 26 formed in the space thus provided.

It will be understood from the foregoing description of the construction of the housing and of the fan element, that the construction provides ventillating means, whereby cooling currents of air are drawn iinto the machine at one end, caused to circulate over the entire inner surfaces of the machine, and discharged therefrom after having traversed said surfaces. It will be noted, that in the machine, as shown, longitudinal passages are provided through the armature between the arms of the spider 9 adjacent to the armature shaft, as well as adjacent to the housing of the machine. Thus all the interior surfaces of the machine are subjected to the cooling influences of the circulating air currents.

Therefore, this construction provides efficient means for accomplishing the objects stated in the foregoing parts of the specification, in respect of maintaining the machine in condition for efficient operation and preventing damage to the machine by obviating overheating thereof.

In the drawings is illustrated a satisfactory form of lubricating means, although it will be understood that this structure is illustrated and described merely as an incident of a satisfactory machine, and that such structure does not constitute a part of the invention.

Each of the end plates 3 has a cylindrical boss 28 extending vertically at substantially right angles to the armature shaft. Said bosses 28 have hollow central openings that are intersected by the bearings 33 for the armature shaft. The hollow openings in the bosses 28 below the shaft constitute oil wells 29, and those above the shaft constitute oil inlet chambers 30. The lower ends of the chambers 29 are closed by caps 31, screwed into the openings, and the chambers 30 are closed by threaded caps 32. Each of the chambers 29 and 30 is provided with a filling comprising a piece of wick or other substance capable of transmitting the oil by capillary action.

In axial alignment with the shaft is an enlargement or boss 40 on each of the elements 28, said bosses 40 being formed with openings 41, which develop into recesses or wells 42. The wells 42 communicate with the chambers 29 by passages 43. Obviously when the chambers 30 are filled with a lubricant, the oil will move by gravity to the bearings 33, from which a portion of the lubricant will work out of the bearings into the wells 42. From the wells 42 the lubricant passes through the passages 43 into the chambers 29 and is conducted to the bearings 33 by the wick. Thus, it is obvious that a constant and continuous supply of lubricant is directed to the bearings 33 from both above and below, thereby maintaining the armature shaft in condition for efficient operation.

From the foregoing it will be seen that I have shown and described my present invention embodied in an induction alternating current motor. The invention has been so shown and described for purposes of convenience only and it is obvious that by simple mechanical variations well within the skill of those familiar with the art the invention may be applied to motors of other types. Accordingly, it will be understood that where reference is made to the field magnet elements and to the armature these terms are used in a broad sense and are intended to embrace also the rotor and stator elements of motors of other types.

I am aware that the invention may be modified in other particulars without departing from the spirit and scope thereof. I do not limit myself, therefore, to exact details shown and described, but what I claim and desire to secure by Letters Patent, is:—

1. In an electric machine, a housing having a pair of opposite end walls, a flange within the housing between the end walls having openings for the passage of air therethrough between the field magnet elements and the housing, field magnet elements supported by said flange spaced from said housing, an armature supported for rotation within the field magnet elements, longitudinal air passages along the inner side of said armature, air inlet passages through one end wall of the housing between the plane of the openings in said flange and the plane of said first-named passages, air outlet passages through the opposite end of the housing between the plane of the openings through said flange and said first-named passages, a fan within the housing for drawing the air through the space between said field magnet elements and said housing and through said first-named passages and discharging air through said outlet passages, and an inwardly convexed ring in connection with said fan between said outlet passages and said space between the field magnet elements and the housing.

2. In an electric machine, a housing having a pair of opposite end walls, a flange within the housing between the end walls having openings for the passage of air therethrough between the field magnet elements and the housing, field magnet elements supported by said flange spaced from said housing, air inlet passages through one end wall of said housing inwardly from the plane of the openings in said flange, air outlet passages through the opposite end wall of the housing inwardly from the plane of the openings through said flange, a fan within the housing for drawing the air through said openings and through the space between the field magnet elements and the housing and for discharging the air through said outlet passages, and an inwardly convexed ring on said fan between said outlet passages and the space between the field magnet elements and the housing causing the air to pass across the end of the field magnet elements.

3. In an electric machine, a housing having a pair of opposite end walls, a flange within the housing between the end walls having openings for the passage of air therethrough between the field magnet elements and the housing, field magnet elements supported by said flange spaced from the housing, an armature supported for rotation within the field magnet elements, longitudinal air passages along the inner side of said armature, air inlet passages through one end wall of the housing between the plane of the openings in said flange and the plane of said passages in the armature, air outlet passages through the opposite end wall of the housing between the plane of said passages through the armature and the plane of said space between the field magnet elements and the housing a fan between the end wall having the air outlet passages and said field magnet elements and armature, and an inwardly convexed ring between said outlet passages and the space between the field magnet elements and the armature having its outer edge beyond the plane of said outlet passages.

ALLEN M. HARRELSON.